(12) United States Patent
Jeong

(10) Patent No.: US 7,469,807 B2
(45) Date of Patent: Dec. 30, 2008

(54) CROSSBAR ASSEMBLY FOR A VEHICLE

(75) Inventor: Dae Seok Jeong, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 757 days.

(21) Appl. No.: 11/024,862

(22) Filed: Dec. 28, 2004

(65) Prior Publication Data
US 2005/0224542 A1    Oct. 13, 2005

(30) Foreign Application Priority Data
Apr. 6, 2004    (KR) .................. 10-2004-0023332

(51) Int. Cl.
*B60R 9/00*    (2006.01)
(52) U.S. Cl. ..................... 224/321; 224/325
(58) Field of Classification Search ............. 224/321, 224/322, 325, 330, 309
See application file for complete search history.

(56) References Cited
U.S. PATENT DOCUMENTS

| | | | | |
|---|---|---|---|---|
| 5,419,479 A | * | 5/1995 | Evels et al. ............... | 224/321 |
| 5,924,614 A | * | 7/1999 | Kuntze et al. ............. | 224/321 |
| 6,796,471 B2 | * | 9/2004 | Aftanas et al. ............ | 224/321 |
| 7,198,184 B2 | * | 4/2007 | Aftanas et al. ............ | 224/309 |

FOREIGN PATENT DOCUMENTS

DE    4440922 A1 *    5/1996

* cited by examiner

*Primary Examiner*—Nathan J Newhouse
*Assistant Examiner*—Corey N Skurdal
(74) *Attorney, Agent, or Firm*—Morgan, Lewis & Bockius LLP

(57) ABSTRACT

The crossbar assembly includes a crossbar spanned between two side rails spaced apart from each other and sliding means fixed to both ends of the crossbar for slideably engaging the crossbar with the side rails. The sliding means including a rotatable lever, a lower clamp operative in conjunction with the rotatable lever, and a pad on which the side rail sits. The side rails disposed at the left side and right side of the roof panel of a vehicle have different bottom surfaces. Moreover, the pads of the sliding means, which directly contact the bottom surfaces of the side rails, have different sitting surfaces in order to tightly contact with the side rails. Accordingly, it is possible to effectively prevent the crossbar from being installed to the side rails in a reverse direction.

5 Claims, 6 Drawing Sheets

Crossbar ASSEMBLY FOR A VEHICLE

CROSS REFERENCE TO RELATED APPLICATION

This application is based on, and claims priority to Korean Patent Application No. 2004-0023332, filed on Apr. 6, 2004, the disclosure of which is hereby incorporated by reference.

TECHNICAL FIELD OF THE INVENTION

The present invention relates to a crossbar assembly that is coupled with a roof rack assembly mounted on a vehicle. More particularly, the present invention relates to a crossbar assembly having sliding means at both ends thereof, by which the crossbar assembly slideably moves on side-rails of a roof rack assembly.

BACKGROUND OF THE INVENTION

A roof rack assembly and a crossbar assembly are commonly mounted on the roof panel of SUV's (sport-utility vehicles) in order to carry luggage, bicycles, skis and other large sporting gear that is too long or too big for stowage within the vehicle.

However, conventional crossbar assemblies and roof rack assemblies have a number of drawbacks. For example, the crossbar may be accidentally attached to the side rails in the wrong direction. In other words, if a customer inadvertently mounts the crossbar assembly to the side rails in the reverses direction, the crossbar may generate wind noise while driving because the front surface and the rear surface of the crossbar are designed differently with different aerodynamic features.

SUMMARY OF THE INVENTION

The present invention provides a crossbar assembly capable of preventing a crossbar from being installed to side rails in a reverse direction by employing two sliding means attached at each end of the crossbar. Each sliding means has a sitting surface of a unique shape corresponding to each side rail having a different cross section. Therefore, it is possible to prevent generation of wind noise due to a reversely mounted crossbar.

One embodiment of a crossbar assembly according to the present invention includes a crossbar spanned between two side rails spaced apart from each other and sliding means fixed to each end of the crossbar for slideably engaging the crossbar with the side rails. The sliding means includes a rotatable lever, a lower clamp operative in conjunction with the rotatable lever, and a pad on which the side rail sits. The side rails disposed at the left side and right side of the roof panel of a vehicle have different bottom surfaces with each other. Moreover, the pads of the sliding means, which directly contact the bottom surfaces of the side rails, have different sitting surfaces in order to tightly contact with the side rails. With such an arrangement, it is possible to effectively prevent the crossbar from being installed to the side rails in a reverse direction.

Preferably, one of the sliding means is provided with a pad having a protrusion thereon while the other sliding means is provided with a pad of flat type. The side rails are correspondingly provided with a recess portion adapted to receive the protrusion of the pad on the bottom surface thereof and a flat bottom surface, respectively. More preferably, the inner profiles of the cross section of the side rails are identical to each other.

BRIEF DESCRIPTION OF THE DRAWINGS

The aforementioned aspects and other features of the present invention will be explained in the following detailed description, taken in conjunction with the accompanying drawings, wherein.

DETAILED DESCRIPTION OF PREFERRED EMBODIMENT

Figure 1:
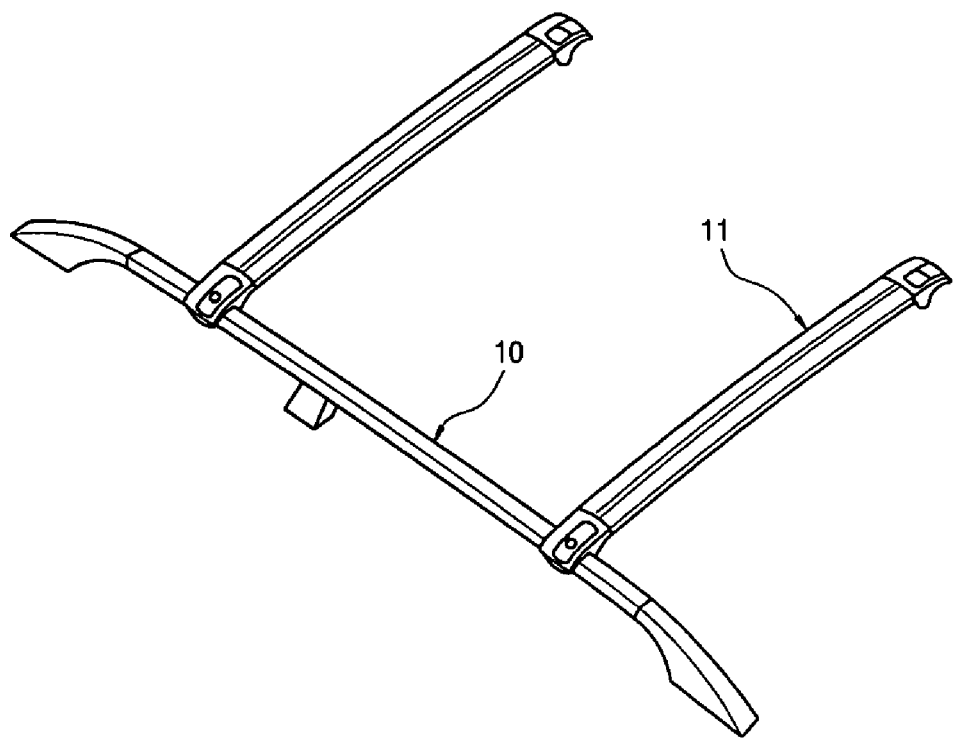
FIG. 1 is a perspective view showing crossbar assemblies coupled to a roof rack assembly, according to an embodiment of the present invention.
Figure 2:
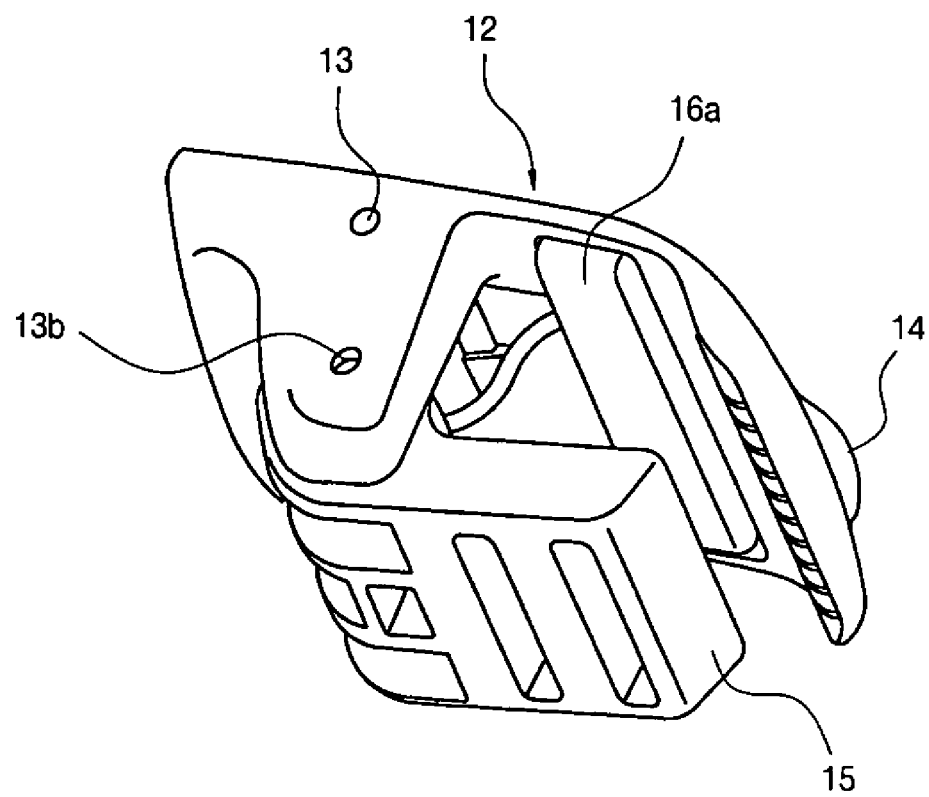
FIG. 2 is a perspective view of a sliding means according to an embodiment of the present invention.
Figure 3:
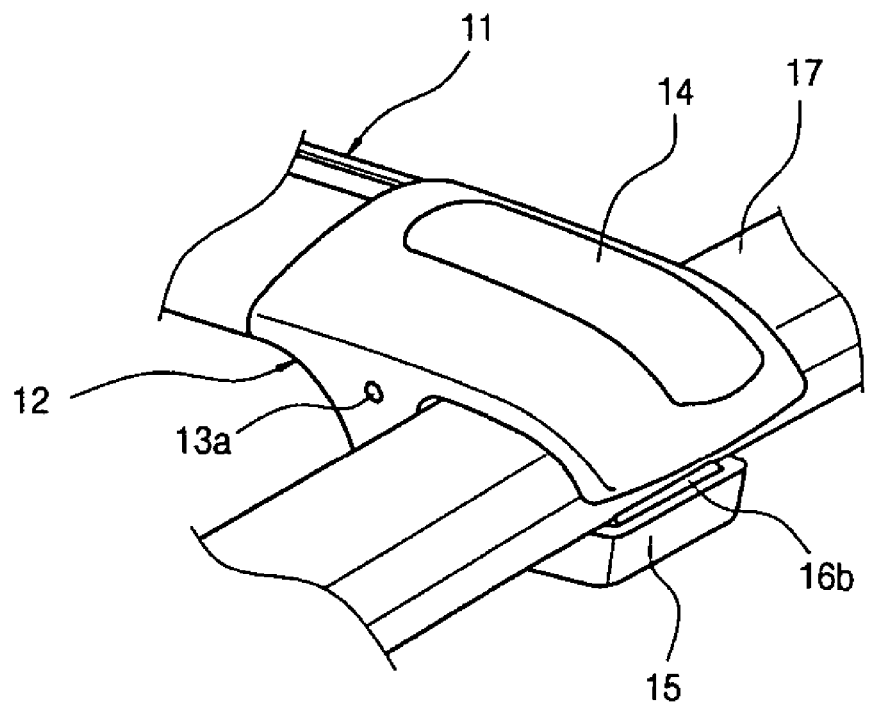
FIG. 3 is a partially enlarged view of FIG. 1 showing an engagement of a crossbar assembly to a side rail, according to an embodiment of the present invention.

As shown in FIG. 1, in the preferred embodiment, two roof rack assemblies 10 are mounted at both sides on a roof panel in a fore-and-aft direction of a vehicle, in which two crossbars 11 span side rails 17 of the roof rack assemblies. Each crossbar 11 is securely engaged with the side rail 17 of the roof rack assembly 10 by means of sliding means 12 installed at both ends thereof.

Figure 4:
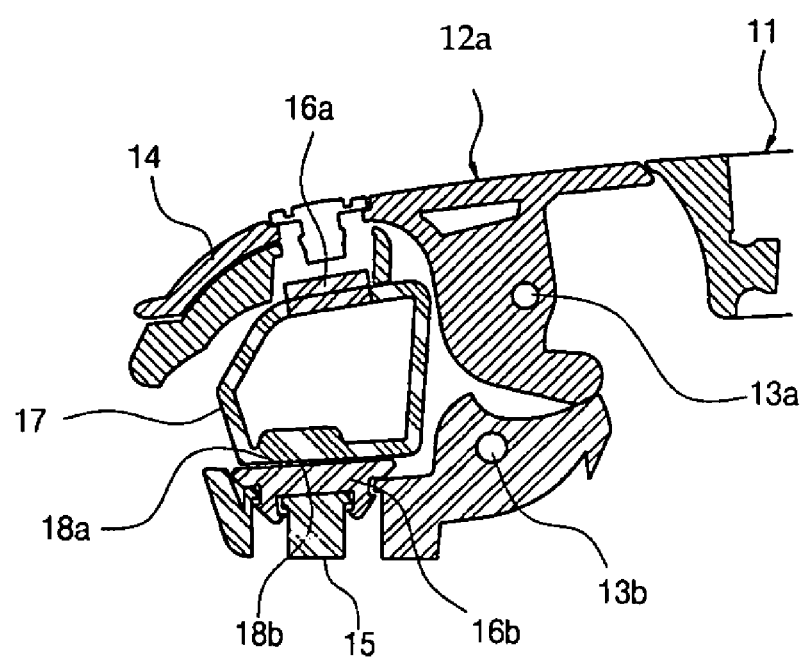
FIG. 4 is a cross-sectional view of a sliding means installed at the left side of a crossbar, according to an embodiment of the present invention.
Figure 5:
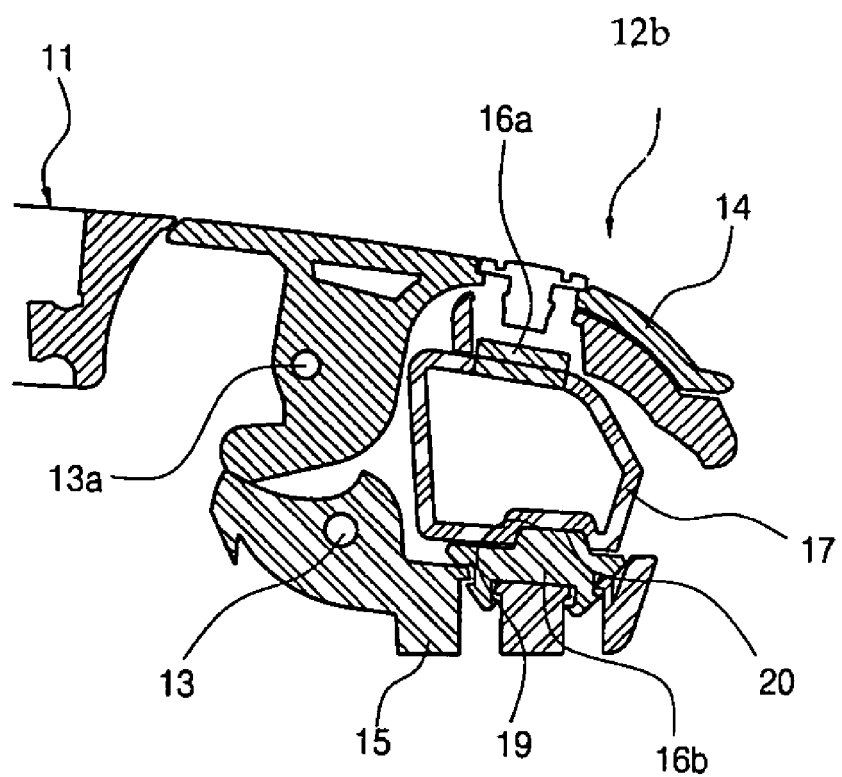
FIG. 5 is a cross-sectional view of a sliding means installed at the right side of a crossbar, according to an embodiment of the present invention.

Referring to FIG. 4 and FIG. 5, the sliding means (12a, 12b) each include a lever 14 rotatable about a pin 13a, a clamp 15 operative in conjunction with the rotation of the lever 14, and a pad 16b fit into holes formed on the clamp 15. In order to prevent the crossbar 11 from being installed to the side rails 17 in the reverse direction, the pads 16b inserted into the sliding means (12a, 12b) have different shapes. Each side rail 17 accordingly has a different shape to correspond with the shape of pads 16b.

Particularly, the sliding means 12a attached at the left end of the crossbar 11 is provided with a flat type pad 16b on which the side rail having a flat bottom surface 18b sits, while the sliding means 12b attached at the right end of the crossbar 11 is provided with the pad 16b having a protrusion portion 19, into which the side rail having a recess 20 fits. With such an engagement structure of the side rails and the sliding means, the crossbar assembly cannot be installed wrongly to the side rail in the reverse direction.

When someone inadvertently tries to mount the right sliding means onto the left side rail, the protruded portion of the pad interferes with the flat bottom surface of the side rail, thereby disabling operation of the lever.

In the preferred embodiment, overall sizes of the side rails are the same. As depicted in FIG. 4 and FIG. 5, considering the conjunction with front and rear stanchions, inner profiles of the cross-sections of the right and the left side rails are configured to be identical with each other, while the outer profiles of the cross sections of the right and the left side rails are formed differently according to the shapes of corresponding pads of the sliding means.

In this arrangement, clamping and releasing operations of the sliding means, especially the right sliding means, are described below.

Figure 6:
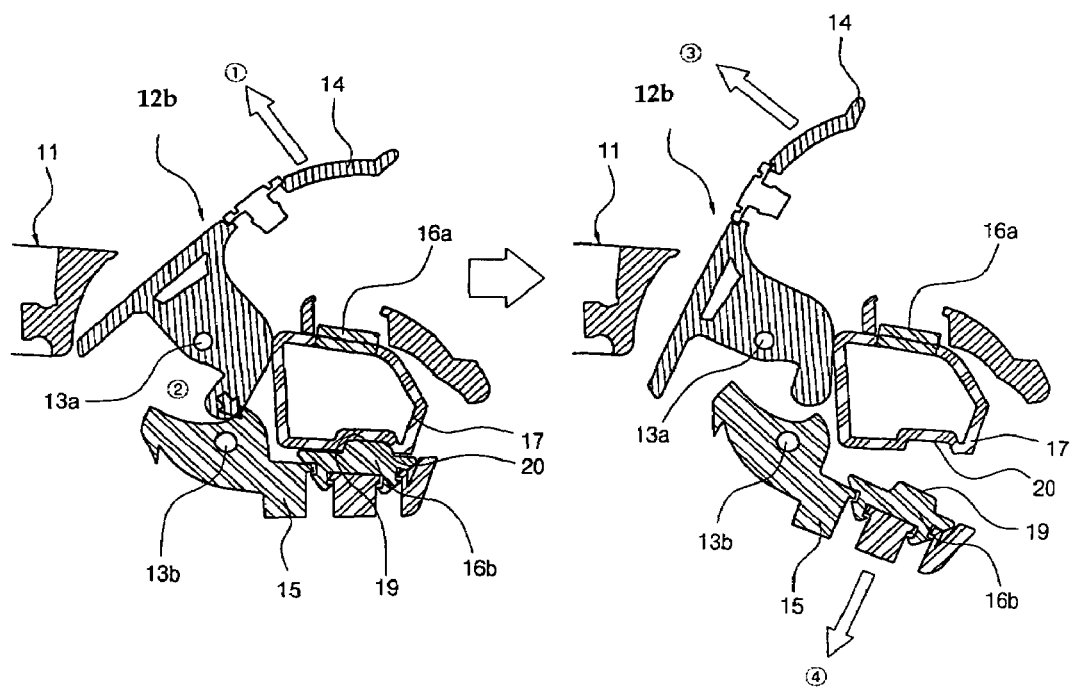
FIG. 6 are cross-sectional views showing the operation of the sliding means installed at the right side of a crossbar, according to an embodiment of the present invention.

Referring to FIG. 6, when the lever 14 is pulled upward in the direction of the arrow 1, the lower portion of the lever 14 contacts the upper portion of the clamp 15 in the direction of an arrow 2 while rotating about the pin 13a. Subsequently, when the lever 14 rotates further in the direction of an arrow 3 pushing down the clamp 15, the clamp 15 rotates around the pin 13b in the direction of arrow 4 and is detached from the side rail 17. The clamping operation of the sliding means is accomplished in the reverse manner of the foregoing releasing operation.

As described above, the crossbar assembly according to the preferred embodiment is advantageous in that the sliding means attached at both ends of the crossbar basically prevent a crossbar from being installed to side rails in a reverse direction. Therefore, it is possible to prevent generation of wind noise due to a reversely mounted crossbar.

Even though the present invention is described in detail with reference to the foregoing embodiment, it is not intended to limit the scope of the present invention thereto. It is evident from the foregoing that many variations and modifications may be made by a person having ordinary skill in the present field without departing from the essential concept of the present invention.

What is claimed is:

1. A crossbar assembly comprising:
   a crossbar spanned between two side rails spaced apart from each other; and
   two sliding means fixed to both ends of the crossbar and configured to slideably engaging the crossbar with the side rails, the sliding means including a rotatable lever, a lower clamp operative in conjunction with the rotatable lever, and a pad on which the side rail sits, wherein the side rails disposed at the left side and right side of a roof panel of a vehicle have different shaped bottom surfaces and the pads of the sliding means, which directly contact the bottom surfaces of the side rails, have different shaped contact surfaces to tightly contact with the side rails, thereby effectively preventing the crossbar from being installed to the side rails in a reverse direction, wherein inner profiles of a cross-section of the right side rail and the left side rail of the two side rails are identical with each other.

2. The crossbar assembly according to claim 1, wherein one of the sliding means is provided with a pad having a protrusion thereon while another of the sliding means is provided with a pad of flat type, and the side rails are correspondingly provided with a recess portion adapted to receive the protrusion of the pad on the bottom surface thereof and a flat bottom surface, respectively.

3. A crossbar assembly comprising:
   a first rail spaced apart from a second rail, wherein the first rail has a first bottom surface and said second rail has a second bottom surfaced shaped different to said first bottom surface;
   a crossbar having a first end and a distal second end, wherein said crossbar is configured to span said first and second rails;
   a first sliding mechanism fixed to said first end of said crossbar and configured to slideably engage the crossbar with the first rail, wherein said first sliding means comprises:
      a first rotatable lever;
      a first clamp operative in conjunction with said first rotatable lever; and
      a first pad which contacts said first bottom surface of said first rail at a first contact surface;
   a second sliding mechanism fixed to said second end of said crossbar and configured to slideably engage the crossbar with the second rail, wherein said second sliding means comprises:
      second rotatable lever;
      a second clamp operative in conjunction with said second rotatable lever; and
      a second pad which contacts said second bottom surface of said second rail at a second contact surface,
   wherein said first contact surface has a different shape than said second contact surface to ensure that the first end of the crossbar is coupled to said first rail and said second end of said crossbar is coupled to said second rail;
   wherein inner profiles of a cross-section of the first rail and the second rail are identical to one another.

4. The crossbar assembly according to claim 3, wherein said first contact surface has a protrusion thereon and said second contact surface is flat.

5. The crossbar assembly according to claim 4, wherein said first bottom surface is provided with a recess portion adapted to receive the protrusion of the first contact surface, and the second bottom surface is flat.

* * * * *